United States Patent [19]

Kawase

[11] Patent Number: 4,459,625
[45] Date of Patent: Jul. 10, 1984

[54] TAPE WITHDRAWING MEMBER DRIVE SYSTEM

[75] Inventor: Hideyuki Kawase, Katsuta, Japan

[73] Assignee: Hitachi, Ltd., Tokyo, Japan

[21] Appl. No.: 316,641

[22] Filed: Oct. 30, 1981

[30] Foreign Application Priority Data

Nov. 7, 1980 [JP] Japan .................................. 55-158572

[51] Int. Cl.³ .............................................. G11B 5/08
[52] U.S. Cl. ...................................... 360/85; 360/95; 242/198
[58] Field of Search .................... 360/85, 95, 130, 132, 360/93; 242/198-200

[56] References Cited

U.S. PATENT DOCUMENTS

| | | | |
|---|---|---|---|
| 4,092,684 | 5/1978 | Umeda | 360/85 |
| 4,126,888 | 11/1978 | Hayashi et al. | 360/85 |
| 4,258,399 | 3/1981 | Iijima | 360/85 |
| 4,309,731 | 1/1982 | Yoshida et al. | 360/85 |

Primary Examiner—Aristotelis M. Psitos
Assistant Examiner—Kin Wong

Attorney, Agent, or Firm—Antonelli, Terry & Wands

[57] ABSTRACT

A tape withdrawing member drive system forming a part of a loading mechanism for withdrawing a tape from a cassette for movement along a predetermined path of travel including gears driven from a motor through a rotation transmitting device, connecting linkages each including a plurality of joints supported at one end thereof by an end surface of one of the gears and engaging at the joint at the other end thereof one of tape withdrawing members. The system further includes the features that guide grooves for guiding the joints of the linkages and the joints at the other end and extending to the other end surface of the gears include arcuate groove sections concentric with the center of rotation of the gears and arcuate groove sections of radii equal to the length of the second link of each linkages, and that one of the gears is formed on a surface thereof opposite the surface at which the guide groove is formed with a cam groove for manipulating another mechanism and a cam groove for actuating a multiple contact slide switch.

8 Claims, 7 Drawing Figures

TAPE WITHDRAWING MEMBER DRIVE SYSTEM

BACKGROUND OF THE INVENTION

This invention relates to a loading mechanism for a video tape recorder (VTR), etc., for withdrawing a tape from a cassette and making same travel along a predetermined path of travel before being returned to the cassette after completing its movement along the predetermined path.

One example of the loading mechanism for a cassette type VTR is shown in U.S. Ser. No. 7,974, now U.S. Pat. No. 4,258,399, (which corresponds to Japanese Patent Application Laid-Open No. 108606/79), in which rotation of an electric motor in the normal direction causes a belt through pulleys to rotate a worm and two worm gears. Connecting linkages secured at one end thereof by pins to the worm gears move in such a manner that the connecting pins move along guide grooves and are then drawn into the lower portions of the worm gears while being successively guided along arcuate grooves formed in the worm gears. The other end portion of each connecting linkage opposite the one end portion secured by the pin to one of the worm gears engages a tape withdrawing member serving concurrently as a tape guide, so that the tape withdrawing member also moves along such arcuate groove and reaches a catcher while withdrawing the tape from the cassette. The tape withdrawing member does not advance farther than the catcher. At this time, the connecting pin connecting one link member of one of the connecting linkages secured by the pin to the next link member has moved to the terminating end portion of the arcuate groove of each worm gear, so that each worm gear stops rotating any further.

Some disadvantages are associated with the mechanism of the aforesaid construction. In this mechanism, it is difficult to set a large angle of rotation for each worm gear to rotate after the tape withdrawing member, serving concurrently as a tape guide, has moved to a predetermined position. Thus, difficulties would be experienced in further rotating the worm gears and manipulating the connecting linkages by the rotation of the worm gears. If the worm gears are forcibly rotated, the problem would arise that the reliability of the mechanism might be lowered in performance. By additionally using a motive force generating element, it would be possible to obtain a mechanism of high reliability in performance. However, this would entail a rise in cost which is not desirable.

SUMMARY OF THE INVENTION

This invention has been developed for the purpose of obviating the aforesaid disadvantages of the prior art.

Accordingly an object of this invention is to provide a tape withdrawing member drive system in which the gears can be rotated over a wide range more than they have been able to rotate in the prior art even after each tape withdrawing member is moved to a predetermined position, so as to manipulate the linkages by the additional rotation of the gears and to enable an additional operation to be performed without requiring to use an additional motive force generating element.

Another object is to provide a tape withdrawing member drive system in which one of the gears is formed at an end surface thereof with a cam groove for operating another mechanism and a cam groove for actuating a multiple contact slide switch for detecting a plurality of positions in which the rotation of the gears should be stopped, to thereby ensure that the gears are positively stopped in the predetermined positions.

The outstanding characteristics of the invention are that guide grooves for the joints of the connecting linkages wound by the gear members have a suitable set shape, and that one of the gear members is formed at one end surface thereof with a linkage manipulating cam groove and a switch actuating cam groove. According to the invention, there is provided, in a tape withdrawing member drive system forming a part of a loading mechanism for withdrawing a tape from a cassette for travel along a predetermined path of movement and returning the tape to the cassette comprising gear members driven by a motor through rotation transmitting means, connecting linkages each having at least one joint supported at one end by one end surface of one of said gear members and engaging at the other end one of two tape withdrawing members, guide grooves for guiding all or part of the joints of the linkages and the joints at the other end extending as far as the other end surface of the gear members or the vicinity thereof, and a predetermined path of movement of the tape withdrawing members. The characterizing features are that, at the other end surface of the gear members or at the circumference thereof, the guide grooves extending from arcuate groove sections centered at the axes of rotation of the gear members to the terminating end portion of the guide grooves, are in the form of arcs of radii which are equal to the length of the next link of each connecting linkage supported at the radial portion by one of the gear members which are centered at the center line of the arcuate groove sections, and that a cam groove for operating another mechanism and a cam groove for actuating a multiple contact slide switch are formed on the surface of one of the gear members opposite the surface at which one of the connecting linkages is supported through a pin.

DESCRIPTION OF THE PREFERRED EMBODIMENT

Figure 1:
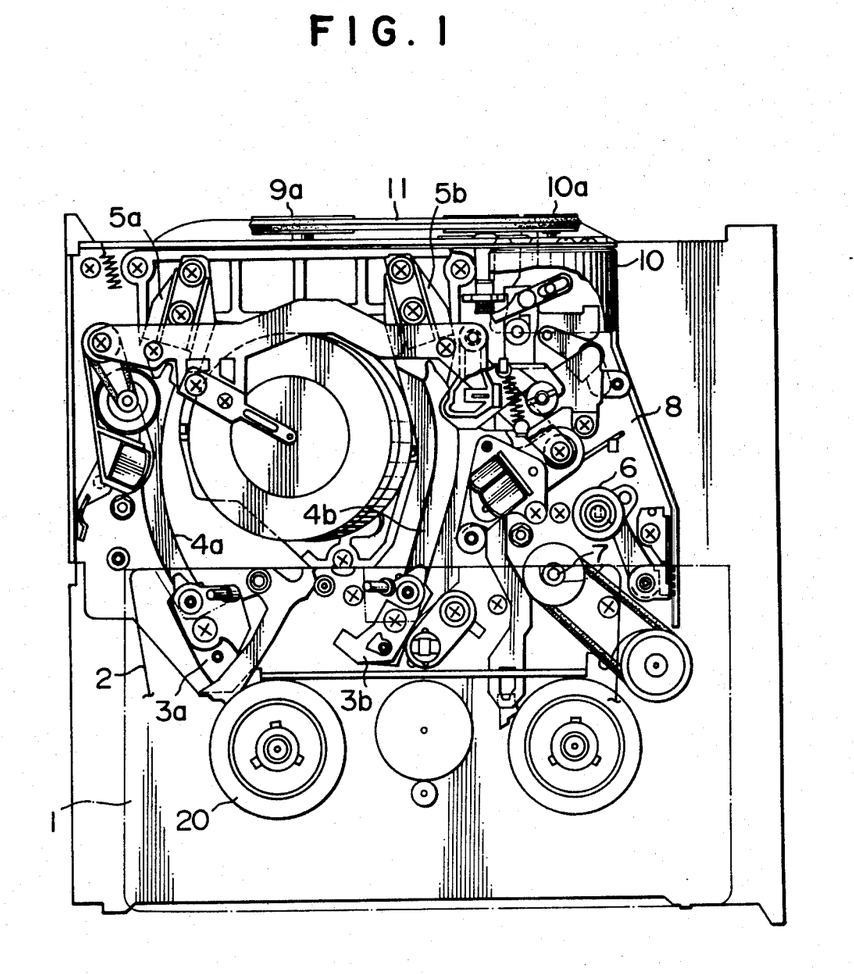
FIG. 1 is a plan view of the mechanical section of a VTR incorporating therein the present invention, shown in an inoperative position.
Figure 2:
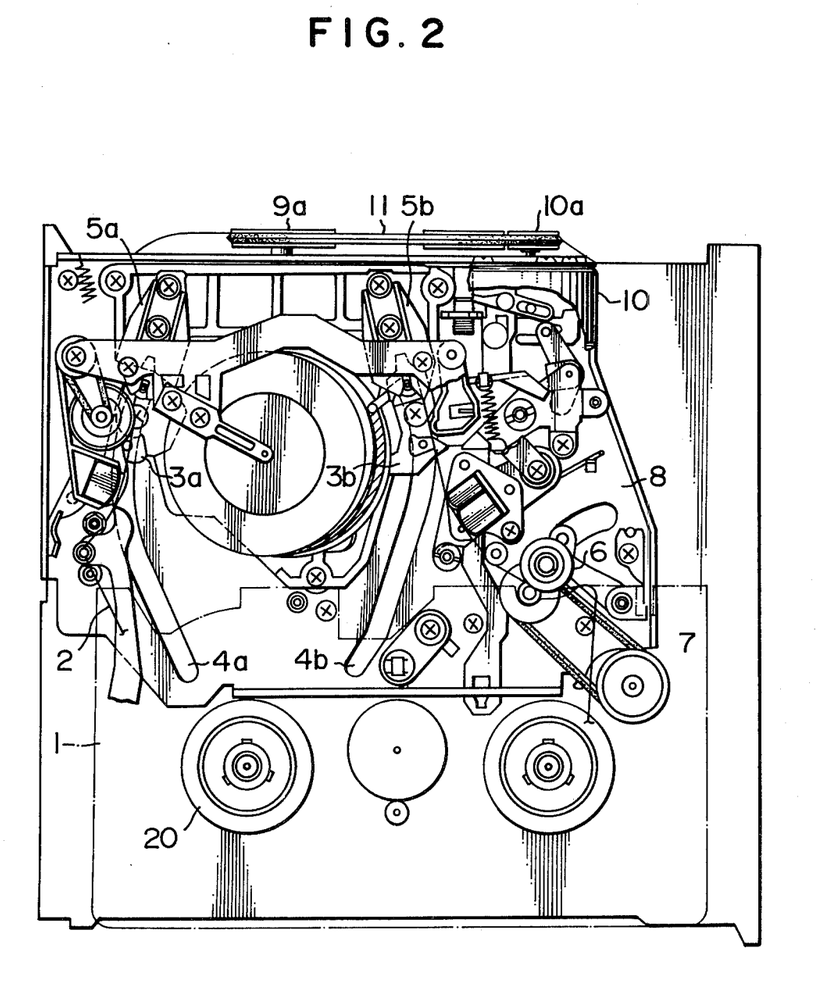
FIG. 2 is a plan view of the VTR shown in FIG. 1, showing the manner in which tape travels at normal speed.

Referring to FIGS. 1 and 2, according to these figures, a tape 2 in a cassette 1, located in a suitable position, is withdrawn as tape withdrawing members 3a and 3b move along guide grooves 4a and 4b, respectively, with the members 3a and 3b serving concurrently as tape guides. After the tape withdrawing members 3a and 3b are respectively caught by catchers 5a and 5b for positioning the members 3a and 3b and secured therein by pressing contact therewith, a pinch roller 6 is brought into pressing engagement with a capstan 7, to enable the tape 2 to travel at normal speed. It is the tape withdrawing member drive system that drives the tape withdrawing members 3a and 3b for operation. FIG. 1 shows the tape 2 before being withdrawn from the cassette 1, and FIG. 2, shows the tape 2 after being withdrawn therefrom.

Figure 3:
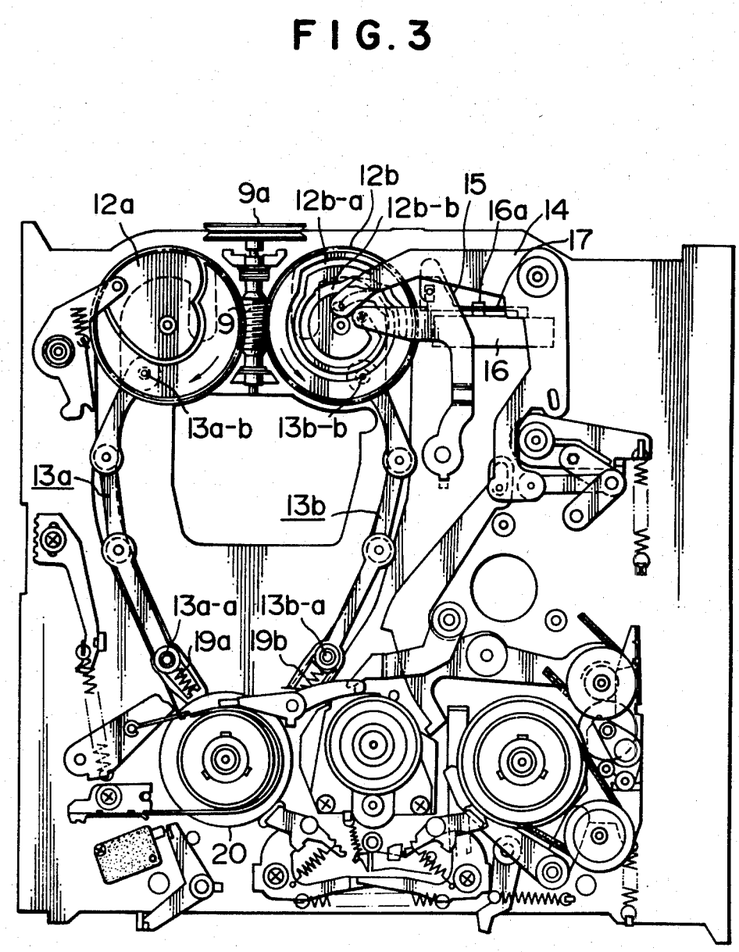
FIG. 3 is a plan view showing the basic portions of the mechanical section of the VTR shown in FIG. 1 with parts thereof being removed in the interest of clarity.
Figure 4:
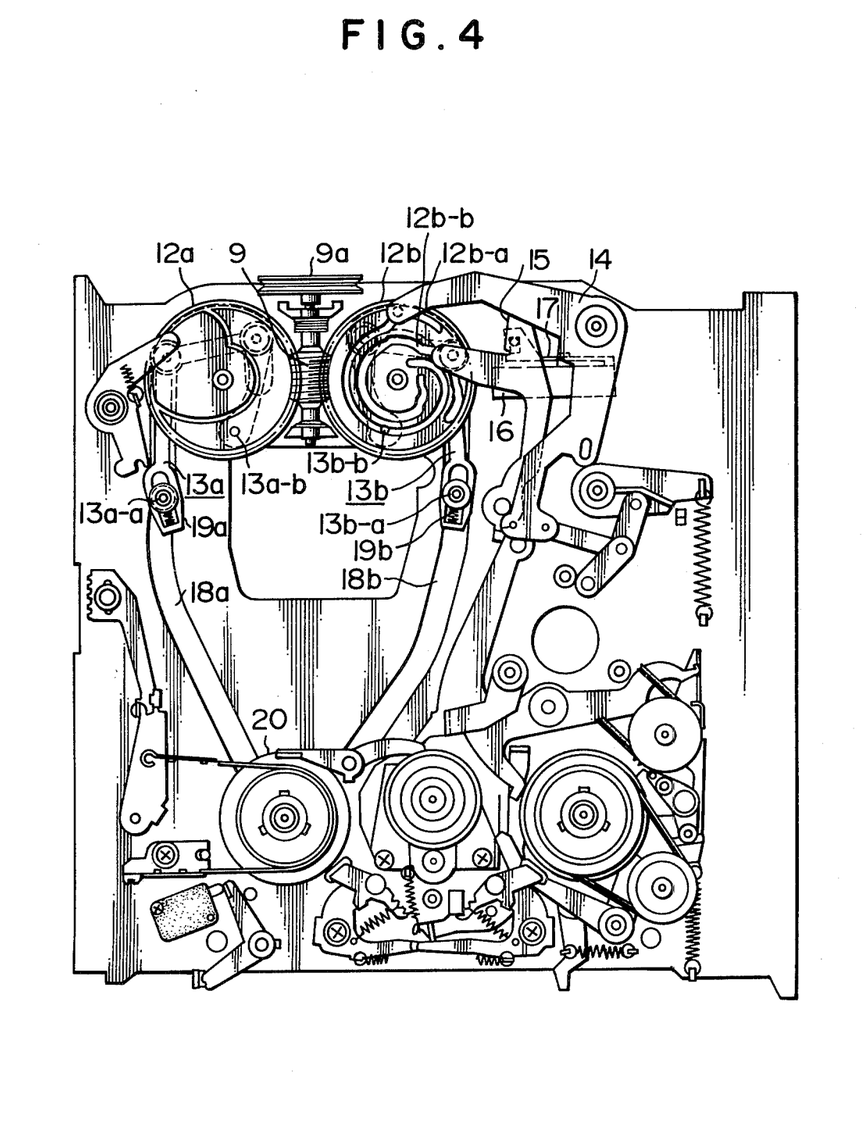
FIG. 4 is a plan view showing the basic portions of the mechanical section of the VTR shown in FIG. 2 with parts thereof being removed in the interest of clarity.

FIGS. 3 and 4 which correspond to FIGS. 1 and 2, respectively show, after removing a subchassis 8 on which the guide grooves 4a and 4b are located and almost all the tape guides are mounted, the tape withdrawing member drive system disposed beneath the subchassis 8. A worm 9 has a pulley 9a attached thereto, and a motor 10 has a pulley 10a attached thereto, with a belt 11 being trained over the two pulleys 9a and 10a. Gears 12a and 12b are located on opposite sides of the worm 9 and in meshing engagement therewith. The gears 12a and 12b support, at the lower end surface thereof, one end of three-segment linkages 13a and 13b, respectively, and the gear 12b is formed at its upper end surface with cam grooves 12b-a and 12b-b in which are respectively engaged a drive arm 14 and a switch actuating arm 15. The switch actuating arm 15 is supported and guided for straight line sliding movement and engages an operating knob 16a of a five-contact type slide switch 16. The drive arm 14 is in engagement with a mechanism for driving the tape 2 and serves as a source of motive force. Joints of the connecting linkages 13a and 13b and joints 13a-a and 13b-a, disposed at an end opposite the end at which members 13a-b and 13b-b are supported by the gears 12a and 12b, respectively, are in engagement with respective guide grooves 18a and 18b for guiding them. The joints 13a-a and 13b-a, respectively in engagement with the guide grooves 18a and 18b respectively, are also in engagement with the tape withdrawing members 3a and 3b and are received in slots formed in the connecting linkages 13a and 13b in a manner to be pressed against one end of the slots by the biasing forces of springs 19a and 19b respectively.

Figure 5:
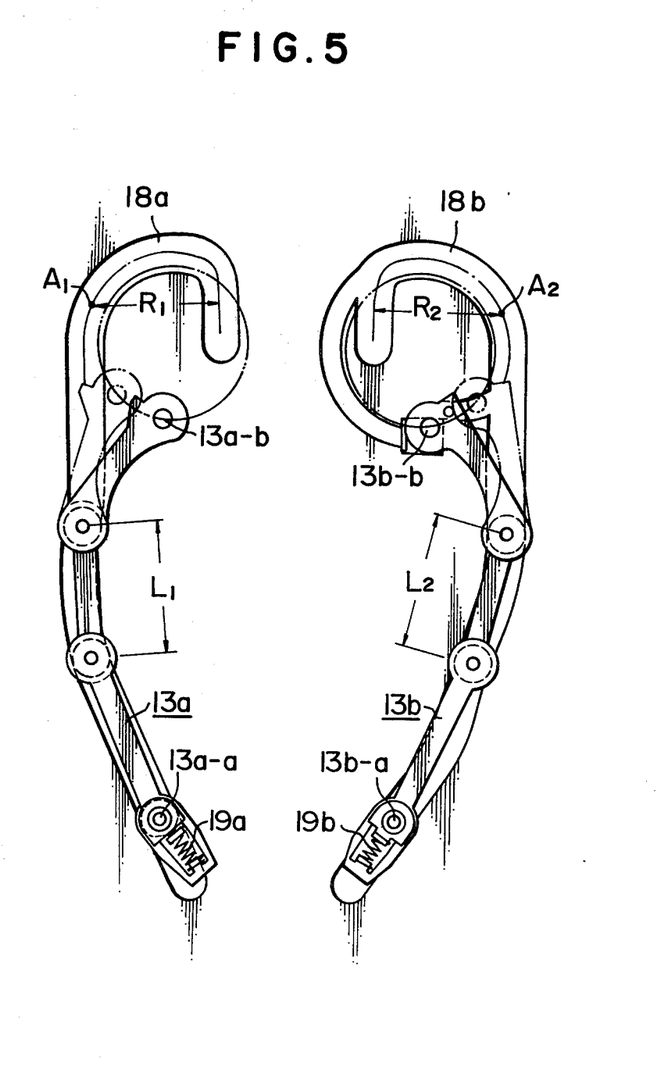
FIGS. 5 and 6 are plan views of the connecting links and the guide grooves, showing their shapes in detail.
Figure 6:
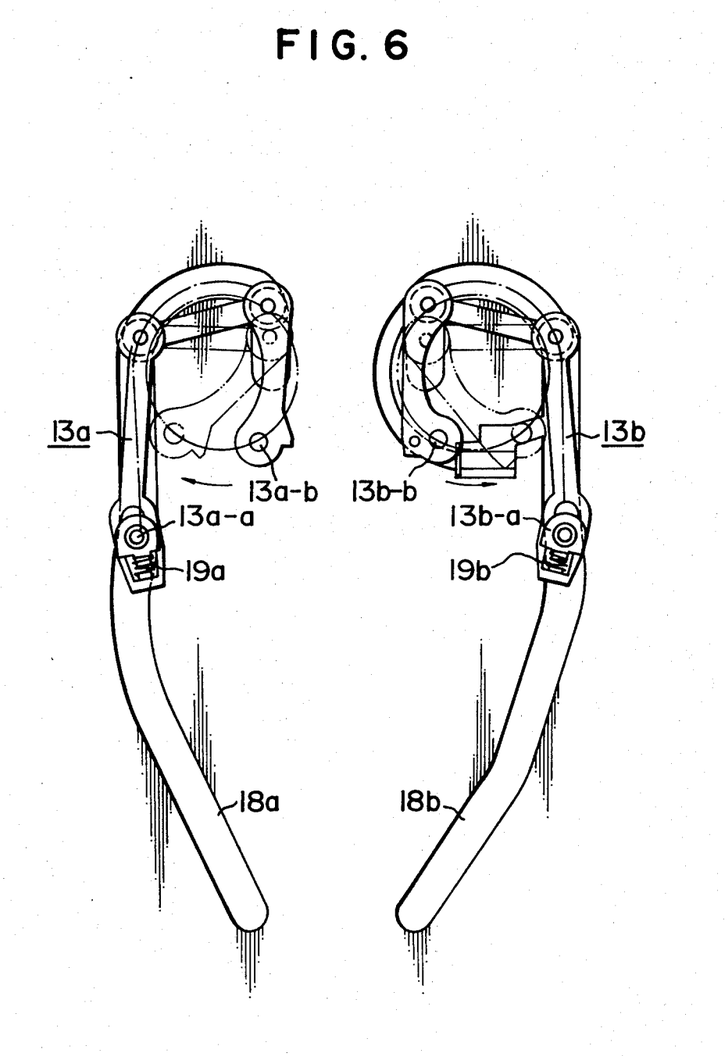
Figure 7:
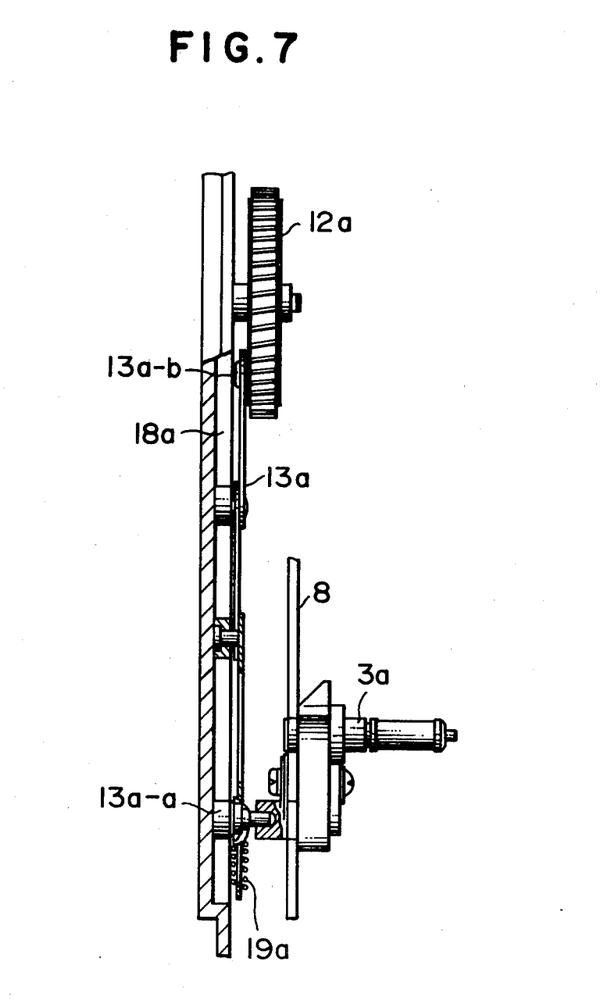
FIG. 7 is a side view of the essential portions of the tape withdrawing member drive system according to the invention, with certain parts being shown in section.

As shown in FIGS. 5 and 6, showing the details of the connecting linkages 13a and 13b and the guide grooves 18a and 18b the guide grooves 18a and 18b are continuous in the lower portions of the gears 12a and 12b from arcuate groove sections concentric with the center of rotation of the gears 12a and 12b to arcuate groove sections of radii $R_1$ and $R_2$ centered at points $A_1$ and $A_2$, respectively. The second links of the connecting linkages 13a and 13b have lengths $L_1$ and $L_2$ which are substantially equal to the radii $R_1$ and $R_2$, respectively.

The tape withdrawing member drive system according to the invention having the above described construction operates as follows. Energization of the motor 10 rotates the same in one direction (in the normal direction, for example), and rotation of the motor 10 is transmitted via the belt 11 to the worm 9 which rotates the gears 12a and 12b in directions indicated by arrows in FIG. 3. This moves the connecting linkages 13a and 13b to cause same to be wound on the lower portions of the gears 12a and 12b while being guided along the guide grooves 18a and 18b, respectively. The tape withdrawing members 3a and 3b, in engagement with the joints 13a-a and 13a-b at the other end of the connecting linkages 13a and 13b, move along the guide grooves 4a and 4b and reach the catchers 5a and 5b, respectively, while withdrawing the tape 2 from the cassette 1. Upon reaching the catchers 5a and 5b, the tape withdrawing members 3a and 3b advance no further. However, rotation of the gears 12a and 12b further winds the linkages 13a and 13b on the lower portions of the gears 12a and 12b respectively. The connecting linkages 13a and 13b, wound until the springs 19a and 19b, at the end of the linkages 13a and 13b, are compressed sufficiently to ensure that the tape withdrawing members 3a and 3b are pressed against the catchers 5a and 5b, respectively, begin at portions of the next joints on the side that is supported by the gears 12a and 12b which are guided by the guide grooves 18a and 18b to enter the arcuate groove sections of the radii $R_1$ and $R_2$ centered at the points $A_1$ and $A_2$, respectively. By this time, the drive arm 14 in engagement with the cam groove 12b-a of the gear 12b, causes the pinch roller 6 to press the tape 2 against the capstan 7 while actuating the tape drive as the drive arm 14 engages different portions of the cam groove 12b-a. Rotation of the capstan 7 causes the tape 2 to travel. Meanwhile the switch actuating arm 15 moves the operating knob 16a of the slide switch 16 via a switch actuating slider 17 as the switch actuating arm 15 contacts different portions of the cam groove 12b-b and engages the contact for the tape traveling mode of the plurality of contacts of the switch 16, to thereby render operative a circuit connected to the slide switch 16 for controlling the system as a whole to deenergize the motor 10 and allow the tape 2 to travel as designed.

When it is desired to stop the movement of the tape 2 and return it to the cassette 1, the motor 10 is rotated in a direction opposite the direction in which it is rotating (or in the reverse direction in the embodiment described). This actuates the loading mechanism and causes same to operate such that the elements thereof act in reverse, to move the tape withdrawing members 3a and 3b backwardly. The tape 2 that is loosened is wound in the cassette 1 by means of another motor, not shown, or a reel drive motor which rotates a pay-out reel deck 20. Upon the tape withdrawing members 3a and 3b returning to their original positions, the slide switch 16 is actuated to engage the first contact, so that the control circuit stops rotation of the motor 10. Also, when it is desired to temporarily interrupt the movement of the tape 2 while keeping it in its path of movement, the cam groove 12b-b only needs to be shaped in such a manner that the direction of rotation of the motor 10 is reversed and a predetermined contact of the slide switch 16 is engaged when the pinch roller 6 is slightly spaced apart from the capstan 7, so that the reverse rotation of the motor 10 can be stopped midway in the path of travel of the tape 2 to accomplish the object.

When it is desired to carry out rewind of the tape 2 while the tape 2 is in the cassette 1, the motor 10 is rotated in the normal direction from a stop position (shown in solid lines in FIG. 5) to rotate the gears 12a and 12b and drive the connecting linkages 13a and 13b to a dash-and-dot line position in FIG. 5, to thereby cause the required contact of the slide switch 16 to be engaged by the cam groove 12b-b to stop rotation of the motor 10. Also, by causing the cam groove 12b-a to actuate the drive arm 14 by the rotation of the gears 12a and 12b to cause necessary operations, such as releasing of the reel deck and the brake, to be performed, it is possible to carry out quick rewind by driving the reel by means of the reel drive motor. When this is the case, the tape withdrawing members 3a and 3b are slightly moved so that the tape 2 is not withdrawn thereby.

As shown in FIG. 6, the gears 12a and 12b may be further rotated from the position in which the tape 2 travels at constant speed, as shown in solid lines, to wind the connecting linkages 13a and 13b to a position indicated by dash-and dot lines. At this time, the links to which the joints 13a-a and 13b-a at the end of the connecting linkages 13a and 13b, respectively, are connected do not move as shown, so that the springs 19a and 19b are not compressed more than is necessary for causing the gears 12a and 12b to rotate further than the positions to which they are rotated during normal travel of the tape 2. This is made possible by the arrangement whereby the second links of the connecting linkages 13a and 13b connected to the links which are in turn connected to the gears 12a and 12b have lengths $L_1$ and $L_2$ which, as shown in FIG. 5, which are equal to the radii of curvature $R_1$, $R_2$ end portions of the guide grooves 18a and 18b on the side of the gears 12a and 12b. By utilizing this additional rotation of the gears 12a and 12b, it is possible to perform an additional operation to realize another condition while the tape 2 is in normal traveling condition.

From the foregoing description, it will be appreciated that the present invention enables the following effects to be achieved:

(1) The feature that actuation of the slide switch for sensing a plurality of operation positions of the connecting linkages connected to the control circuit and manipulation of the connecting linkages are performed by separate cam grooves formed in one of the gears minimizes the danger of misoperation of the switch and the connecting linkages.

(2) The gear formed with the cam grooves drives the connecting linkages for withdrawing the tape, so that synchronization of actuation of the switch with tape withdrawing operation can be effected with minimized error.

(3) When the tape is in normal travel condition, the linkages 13a and 13b are in engagement in the grooves 18a and 18b, respectively, so that the forces exerted by the springs 19a and 19b are hardly exerted on the gears 12a and 12b. This eliminates the danger that forces exceeding the creep limit might be exerted on the gears molded from plastic.

What is claimed is:

1. A tape withdrawing member drive system forming a part of a loading mechanism for withdrawing a tape from a cassett for travel along a predetermined path and returning the tape to the cassett, the tape withdrawing member drive system comprising:
   gear members driven by a motor through rotation transmitting means;
   connecting linkages each having at least one joint supported at one end by one end surface of one of said gear members and engaging at the other end one of two tape withdrawing members;
   guide grooves for guiding all or part of the joints of the linkages and the joints at the other end extending as far as the other end surface of the gear members or a vicinity thereof; and
   a predetermined path of movement of the tape withdrawing members; wherein the improvement comprises:
   at the other end surface of the gear members or at a circumference thereof, the guide grooves extend from arcuate groove sections centered at the axes of rotation of the gear members to terminating end portions formed in arcs of radii which are equal to the length of a next link of each linkage supported at the radial portion by one of the gear members which are centered at the center line of the arcuate groove sections, one of said gear members is formed on a surface thereof opposite the surface on which a link is supported with at least one of a cam groove for operating another mechanism and a cam groove for actuating a switch.

2. A tape withdrawing member drive system as claimed in claim 1, wherein said connecting linkages are composed of three links and guided by one of the guide grooves at three joints.

3. A tape withdrawing member drive system as claimed in claim 1, wherein a link of each of said connecting linkages engaging one of the tape withdrawing members is received at its joint at the other end in a slot formed in the link, said slot being in pressing engagement at one end thereof with a resilient member.

4. A tape withdrawing device as claimed in claim 1, wherein said switch is a multiple contact slide switch.

5. A tape withdrawing device forming a part of a loading mechanism for withdrawing a tape from a cassett for travel along a predetermined path and returning the tape to the cassett, the device comprising:
   at least a pair of gear members driven by a motor through a rotation transmitting means;
   at least two connecting linkages, each of said connecting linkages having at least two links including a first link and a second link, the first link of the respective connecting linkages being connected at a forward end thereof to one end surface of the respective gear members, the second link of each of said connecting linkages being respectively connected at a forward end thereof to a rearward end of the respective first links, the plurality of links of each of said connecting linkages being connected in series through pivotal joint means, a rearward end of each of said connecting linkages is connected to a tape withdrawing member through a further joint means;
   guide grooves for respectively guiding at least a part of said pivotal joint means between the links and said further joint means between said connecting linkages and said tape withdrawing members; and
   wherein each of said guide grooves, in an area of the respective gear members has a groove portion in the form of an arc having a radius which is equal to a length of said second link of each of said connecting linkages, with a center of said arcuate groove portion being arranged at a point at which a rearward end of the respective second links is positioned when a tape withdrawing movement is completed, and
   at least one of said pair of gear members is formed, on a surface thereof opposite the surface on which said first link of one of said connecting linkages is connected, with at least one of a first cam groove means for operating another mechanism and a second cam groove means for actuating a switch.

6. A tape withdrawing device as claimed in claim 5, wherein each of said connecting linkages is composed of three links and guided by one of said guide grooves through three joint means.

7. A tape withdrawing device as claimed in claim 5, wherein said further joint means between said connecting linkages and said tape withdrawing members are received in slots formed in a most rearward link of the respective connecting linkages in such a manner so as to be respectively pressed against one end of the slots by biasing forces of resilient members.

8. A tape withdrawing device as claimed in claim 5, wherein said switch is a multiple contact slide switch.

* * * * *